United States Patent [19]

Canale et al.

[11] Patent Number: 4,763,353

[45] Date of Patent: Aug. 9, 1988

[54] TERMINAL BASED ADJUNCT CALL MANAGER FOR A COMMUNICATION SYSTEM

[75] Inventors: Leonard M. Canale, Middletown; Michael J. Collins, East Windsor; Paul J. O'Brien, Atlantic Highlands; Lisa L. Scott; Martin H. Singer, Fair Haven, all of N.J.

[73] Assignees: American Telephone and Telegraph Company, New York, N.Y.; AT&T Information Systems Inc., Morristown, N.J.

[21] Appl. No.: 830,058

[22] Filed: Feb. 14, 1986

[51] Int. Cl.[4] .......................................... H04M 3/50
[52] U.S. Cl. .................................... 379/157; 379/265
[58] Field of Search ............... 379/157, 164, 165, 156, 379/201, 265, 309

[56] References Cited

U.S. PATENT DOCUMENTS

| 3,643,034 | 3/1972 | Burns et al. ......................... 379/244 |
| 3,740,484 | 6/1973 | Laggy et al. .................... 379/265 X |
| 3,752,936 | 8/1973 | Morse ................................... 379/161 |
| 4,048,452 | 9/1977 | Oehring et al. ...................... 379/113 |
| 4,150,255 | 4/1979 | Theis et al. ............................ 379/84 |
| 4,436,962 | 3/1984 | Davis et al. ...................... 379/214 X |
| 4,506,346 | 3/1985 | Bennett et al. ................. 379/166 X |
| 4,560,837 | 12/1985 | Carson et al. ........................ 379/212 |
| 4,653,085 | 3/1987 | Chan et al. ..................... 379/212 X |

Primary Examiner—James L. Dwyer
Attorney, Agent, or Firm—John A. Caccuro

[57] ABSTRACT

An adjunct call manager unit connects to a station set port of a telephone communication system and receives button identification and status signals to determine line, agent, and feature activation status of the system. In response to one or more of the received status signals, commands are sent to the system using button depression commands and switchhook commands to effectuate call processing control over the system. In one embodiment, the adjunct unit functions as an automated call distributor for managing incoming calls to the system.

16 Claims, 6 Drawing Sheets

FIG. 3

TABLE 300 LINE STATUS TABLE - ONE PER LINE

|     | LINE STATUS (330) | LINE STATE REQUIRED (320) | STATE DESCRIPTION |
|-----|------|------|------|
| 301 | IDLE | IDLE | NO CALL ON LINE |
| 302 | RING | RINGING | AA INCOMING CALL |
| 303 | CONNECTED | CONNECTED | AA ACTIVE ON CALL |
| 304 | CONNECTED | VOICE ANNOUNCEMENT | AA PLACES VOICE ANNOUNCEMENT ON CALL |
| 305 | HOLD | HOLD | AA PLACES CALL ON HOLD |
| 306 | HOLD | TRANSFER | AA TRANSFERRED CALL TO AGENT |
| 307 | CONNECTED | ACTIVE-OTHER | AGENT ACTIVE ON CALL |
| 308 | RING | RETURN FROM TRANSFER | CALL RETURNED TO AA |
| 340 | | LINE STATES NOT REQUIRED | |
| 309 | RING | RINGING-OTHER | INCOMING CALL DIRECTED TO STATION |
| 310 | HOLD | HOLD-OTHER | ANOTHER STATION PUT CALL ON HOLD |
| 311 | HOLD | TRANSFER-OTHER | ANOTHER STATION TRANSFERRED CALL |

FIG. 4

AGENT STATUS TABLE 400 - ONE PER AGENT

|     | LOG-IN | STATION STATUS | AFTER CALL WORK | AGENT STATE |
|-----|--------|----------------|-----------------|-------------|
| 401 | NO | — | — | LOGGED-OUT |
| 402 | YES | ON-HOOK | OFF | AVAIL |
| 403 | YES | OFF-HOOK | OFF | BUSY-ON-CALL |
| 404 | YES | — | ON | BUSY-OTHER |

FIG. 5

TABLE 500

| BUTTON | LINE COMMAND | COMMAND DESCRIPTION |
|---|---|---|
| 501 LINE, OFF-HOOK | CONNECT | CONNECT AA TO A SPECIFIC LINE |
| 502 HOLD | HOLD | PLACE CALL ON CURRENTLY CONNECTED LINE ON HOLD |
| 503 TRANSFER, DSS | TRANSFER | TRANSFER CALL ON CURRENTLY CONNECTED LINE TO SPECIFIC AGENT |

FIG. 6

RECEIVED MESSAGE 601

| HEADER | BUTTON NUMBER /602 | VISUAL STATUS /607 | CRCC |
|---|---|---|---|

TRANSMITTED MESSAGE 610

| HEADER | SWITCHHOOK /612 | DEPRESSED BUTTON NO. /611 | CRCC |
|---|---|---|---|

TABLE 603

| BUTTON NUMBER | FCN | ACD |
|---|---|---|
| 1 | LINE 1 | 0 — 621 |
| 2 | LINE 2 | 1 — 604 |
| ⋮ | ⋮ | ⋮ |
| 10 | LINE 10 | 1 |
| 11 | AGENT 1 | 0 — 618 |
| 12 | AGENT 2 | 1 — 605 |
| ⋮ | ⋮ | ⋮ |
| 15 | AGENT 5 | 1 |
| 16 | DSS 1 | — — 620 |
| ⋮ | ⋮ | ⋮ |
| 25 | DSS 10 | — |
| 26 | DIAL PAD BUTTON * | — |
| 27 | DIAL PAD BUTTON # | • |
| 28 | DIAL PAD BUTTON 1 | • |
| ⋮ | ⋮ | • |
| 36 | DIAL PAD BUTTON 0 | — 606 |
| 37 | HOLD | • — 622 |
| 38 | TRANSFER | — — 619 |

TABLE 608

| VISUAL STATUS | LINE STATUS /609 |
|---|---|
| BS1 | IDLE — 617 |
| BS2 | RINGING — 614 |
| BS3 | HOLD — 616 |
| BS4 | CONNECTED — 616 |

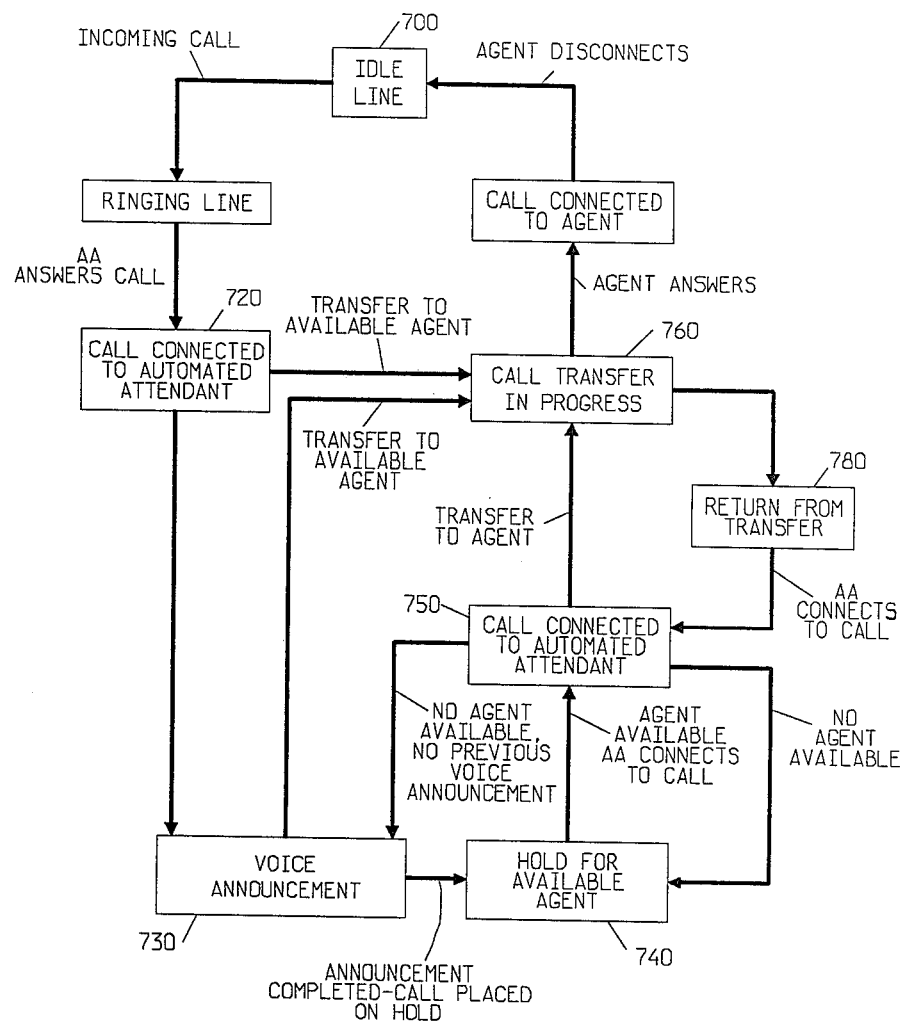

TERMINAL BASED ADJUNCT CALL MANAGER FOR A COMMUNICATION SYSTEM

TECHNICAL FIELD

This invention relates to an adjunct call manager for use with a communication system and more particularly to an adjunct call manager for use at an attendant station port of a telephone communication system.

BACKGROUND OF THE INVENTION

An automatic call distributor (ACD) is used in a telephone communication system to distribute incoming calls among a plurality of agents based upon agent workload. In most prior art systems, the ACD was directly connected to the system controller and hence had to be co-located or located nearby. Consequently, the ACD utilized valuable system controller processing time and memory. Moreover, restricting an ACD location as proximate to the system controller often presented problems for certain user applications. In systems which were not designed to provide an ACD capability, retrofitting a system controller to accommodate an ACD is difficult.

SUMMARY OF THE INVENTION

According to the present invention, an adjunct call manager connects to a station port of a communication system to control various call functions of preselected lines and station sets connected to the communication system. The adjunct call manager receives button identification and status signals from the system controller and determines line, station and feature activation status of the system. In response thereto, the adjunct port manager transmits button and switchhook control signals to the system controller to control various call functions performed by the preselected lines and station sets. In one embodiment, the adjunct call manager provides an ACD function and comprises a personal computer and an interface. The interface converts line and station set status and control signals to computer signal format and vice-versa.

BRIEF DESCRIPTION OF THE DRAWING

The characteristics and operation of the present invention will before apparent from the following detailed description taken in conjunction with the drawings in which:

FIG. 3, Table 300, illustrates the line states derived from line status information received from the communication system;

FIG. 4, Table 400, illustrates the agent states derived from various status information;

FIG. 5, Table 500, illustrates the button and switchhook operations required to transmit line commands to the communication system;

FIG. 6, illustrates the messages received and transmitted to the communication system and the tables utilized by the present invention for decoding received messages;

FIG. 7 shows a state diagram of the call processing functions performed by the automated attendant unit.

GENERAL DESCRIPTION

Figure 1:
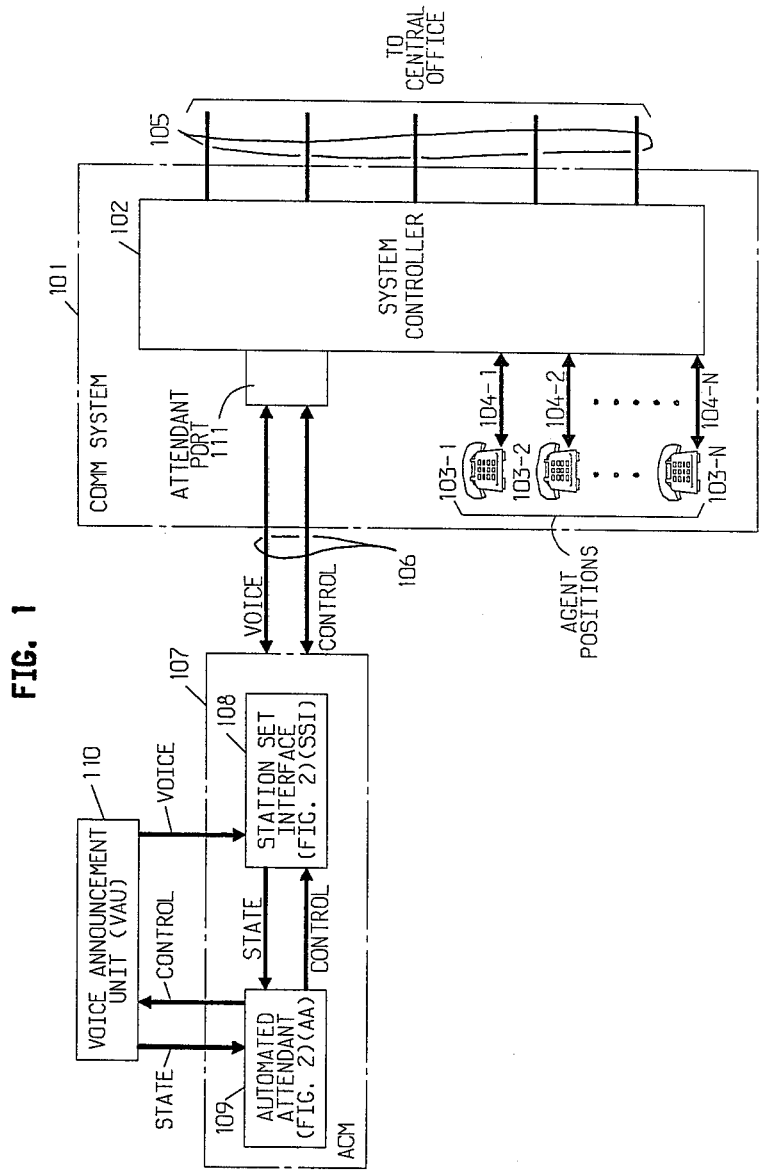
FIG. 1 is a block diagram of a telephone communication system including the present adjunct call manager (ACM) and a voice announcement unit (VAU)

Shown in FIG. 1 is an illustrative block diagram of a communication system useful for describing the operation of the present invention. The system includes communication controller 102 which connects to one or more central office telephone lines 105 and one or more station sets 103-1 through 103-N via loops 104-1 through 104-N. The system also includes an adjunct call manager ACM 107 which connects over attendant port bus 106 to controller 102 and to associated voice announcement unit (VAU) 110. ACM 107 includes station set interface (SSI) 108 and a processor controlled automated attendant (AA) 109.

In one embodiment of the present invention, the adjunct call manager (ACM) is a programmable terminal (including a personal computer) programmed to provide an automated call director (ACD) capability. While the operation of ACM 107, as described herein, illustratively provides an ACD function, it should be recognized that ACM 107 may be arranged to provide other call administrative and data-in-voice-answer (DIVA) functions.

In the ACD arrangement, shown in FIG. 1, station sets 103-1 to 103-N are agent positions. Controller 102 of telephone system 101 monitors the status of lines 105 and agent (station set) positions 103-1 to 103-N and notifies automated attendant 109 via SSI 108 of any changes. Controller 102 is arranged by the system administrator to provide automated attendant 109 with the status of lines and stations which it is to control. Automated attendant 109 generates one or more predetermined call commands for controlling the status of the call. Controller 102 also executes these commands received from automated attendant 109 via SSI 108. System 101 may be one of many well-known telephone communication systems. One telephone system 101 which may be utilized with the present invention is an electronic key telephone system (EKTS) as described in U.S. Pat. No. 4,506,346 filed by Bennett et al, issued on Mar. 19, 1985, which description is incorporated by reference herein. In the following description, telephone system 101 is referred to as EKTS 101.

SSI 108 receives line and agent status signals from controller 102 and converts the signals into a form that can be interpreted by automated attendant 109. In like manner, SSI 108 receives control signals from the automated attendant 109 and transmits them to the controller 102. SSI 108 also connects the recorded voice messages played by VAU 110 to incoming calls. The function and operation of SSI 108 will be described in more detail in a later paragraph.

VAU 110 records and plays voice messages and can in general be implemented using any audio signal recording or playing unit. The VAU 110 operates under the control of the automated attendant 109 which requests that one or more pre-recorded messages be played to a caller.

Automated attendant 109 receives line and agent status information from the SSI 108. Automated attendant 109 processes the received line information, decides how incoming calls are to be serviced, and transmits control signals through the SSI 108 to controller 102. Automated attendant 109 also controls VAU 110 and commands it to present a recorded message to a caller. As the automated attendant 109 processes calls, telephone management statistics or other administrative information may be compiled for report generation.

Although not essential for the operation of the present invention, it is desirable that automated attendant 109 be able to signal to an agent position to indicate that the agent is logged-in and queued to receive a call in the proper turn. Two control signals, agent-active and agent-inactive, are directed to controller 102 which, in turn, signals at the agent's station set the proper activity state.

Automated attendant 109 receives line status information from the EKTS 101 through the station set interface (SSI). Its resident program analyzes changes in line states and agent states and determines which actions to take to direct calls to agents.

Figure 2:
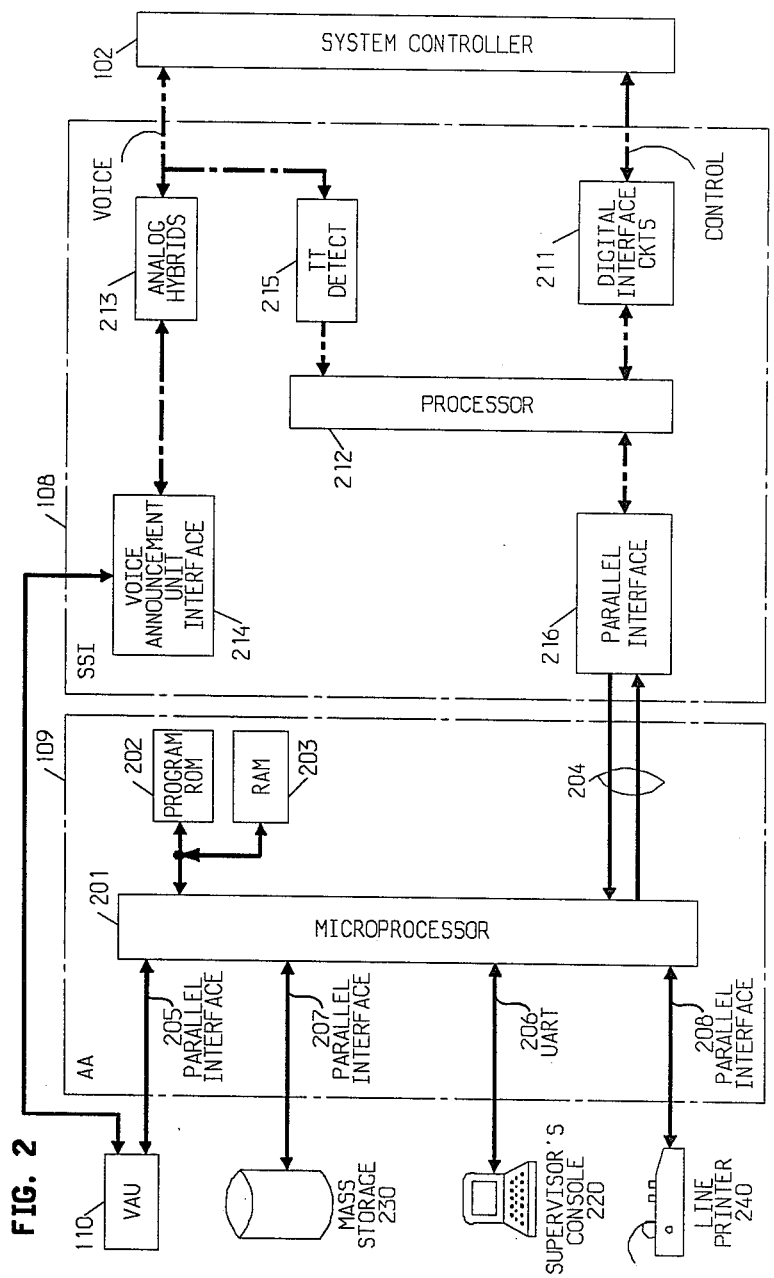
FIG. 2 shows the components of the automated attendant (AA) unit and station set interface (SSI)

FIG. 2 also presents a block diagram of automated attendant 109. Microprocessor 201 executes the program resident in read-only memory (ROM) 202 to determine which calls are to be directed to which agent positions.

ROM 202 contains the control program. The program examines the state information received from VAU 110 and from EKTS 101 through SSI 108, determines which actions are to be taken, and issues control signals to EKTS 101 and VAU 110. The program presents information displays to the supervisor's console 220 and updates the displays as line and agent states change. The program also monitors the supervisor's keyboard at console 220 for administration commands or management information requests. Note, a conventional station set may be part of console 220 or may be controlled by automated attendant 109 to provide voice access to any call being handled by automated attendant 109.

Random-access-memory RAM 203 contains state information for the lines and agents. The RAM also contains line utilization and agent performance statistics compiled for report generation. Its contents are updated as line and agent states change and as the performance information is accumulated.

Automated attendant 109 shares a parallel interface 204 with SSI 108 through which automated attendant 109 receives updated state information from EKTS 101 and transmits commands to EKTS 101.

The VAU interface 205 provides automated attendant 109 with the current state of VAU 110. Automated attendant 109 selects messages and can issue record and play commands to VAU 110.

Supervisor's console 220 connects to automated attendant 109 via a standard UART interface 206 to provide information displays presenting the current state of lines and agent positions. The operator can enter commands at the keyboard to administer the system and to request management reports.

Mass storage 230 is attached to the automated attendant 109 via a parallel interface 207 and contains accumulated performance or other information for report generation. Automated attendant 109 periodically stores accumulated performance or other information in the mass storage 230. The contents of mass storage device 230 are accessed when reports are generated. Management reports are printed on line printer 240 attached to automated attendant 109 via parallel interface 208.

With continued reference to FIG. 2, station set interface 108 contains the analog and digital interface circuitry that connects the system controller 102 of EKTS 101 to automated attendant 109 and VAU 110.

A standard processor 212 contains a local intelligent processor, firmware read-only-memory ROM, and scratch-pad random-access-memory RAM. Processor 212 communicates status and control signals with system 102 via digital interface circuit 211. The processor 212 maintains the integrity of the link layer of the control channel and insures that error conditions are corrected. Valid data frames from EKTS 101 concerning line and agent states are formatted and then passed on to automated attendart 109.

The analog hybrids 213 and VAU interface 214 convert the analog signal to and from VAU 110 into the proper signal levels and characteristics required by the internal analog circuitry of EKTS 101 and VAU 110. Touch-tone detector 215 decodes touch tones received from the caller into a digital format for use by processor complex 212.

Parallel interface 216 is the main communication link between SSI 108 and automated attendant 109. It converts the format of messages between automated attendant 109 and processor complex 212. Messages to and from system controller 102 of EKTS 101 concerning line states, agent states, and control commands are transmitted through parallel interface 216.

EKTS 101 provides a flexible manner in which to distribute telephone calls among multiple station sets 103-1 to 103-N thereof. This section describes the features, state, information, and control signals required of EKTS 101 to implement a terminal ACD in accordance with the present invention. In the following description, a station set is an agent position.

The following paragraphs describe EKTS features required to implement the present invention:

States of All Lines and Agent Positions—Controller 102 provides automated attendant 109 with the current status of all central office lines 105 under its control. In most EKTS 101, special attendant ports 111 provide status information about all lines and station set or agent positions connected to EKTS 101 and can be used by the automated attendant for EKTS control. However, it should be recognized that the attendant port 111 or any station port of EKTS 101 can be used with the understanding that only those lines and station sets status available at the port will be controlled by automated attendant 109. The required line states and agent (i.e., station set) states will be described in later paragraphs.

Line Ring—The line-ring program feature administers which lines are to ring at which station set positions. Lines assigned to automated attendant 109 are to be programmed to either ring only or ring first at attendant port 111.

Hold—The EKTS hold feature is used by automated attendant 109 to place calls on hold until agents are available. Automated attendant 109 can also take calls out of the hold state and re-establish voice connections with the callers.

Transfer—Controller 102 can be commanded by automated attendant 109 to direct a call to an agent position. The call appears ringing at the agent position and can be answered by the agent.

Return from Transfer—If a transferred call is not answered by the destination agent position within a predetermined interval of time, EKTS 101 returns the call to the agent position that initiated the call transfer.

Caller Disconnect—EKTS 101 monitors lines for caller-initiated disconnect. When a call disconnect is detected, controller 102 notifies automated attendant 109 that the line is now idle.

The following EKTS features are not required but improve the operating characteristics of the terminal ACD:

Music on Hold and Transfer—This feature provides music to callers while they are waiting for an agent.

Agent After-Call-Work States—Agents frequently perform work related to a call after the call has been completed. During this time, the agent is not available for other calls. The after-call-work feature permits agents to indicate they are busy with additional work and cannot receive additional calls. Agents can activate the feature at their station set as they begin the work and deactivate the feature when the work is completed. Controller 102 passes the state of the after-call-work feature to automated attendant 109.

The previously referenced line state changes arise from four situations:

1. Callers change line states when they call or hang up.
2. Agents change line states as they answer calls, place outgoing calls, put calls on hold, transfer calls, and hang up.
3. EKTS 101 changes the state of lines as it returns unanswered transferred calls to the original station set position.
4. Automated attendant 109 changes line status as it answers ringing lines, puts calls on hold, and directs the calls to agent positions.

Controller 102 sends automated attendant 109 line changes as they occur. Table 300 in FIG. 3 illustrates the various line status signals. Automated attendant 109 converts the line status information into line state information. It should be noted that there is not a one-to-one correspondence between line status signals 330 and line states 320. Automated attendant 109 according to the present invention generates the required line states 320 from the limited variety of line status 330 information. The required line state information 320 is required by automated attendant 109 for each line under its control.

Note, despite the fact that the same hold-line status is used to represent or confirm different line states (e.g., 305, 306), since automated attendant 109 initiated the action, it knows whether it initiated a hold (i.e., 305) or a transfer (i.e., 306) command. Thus, the hold-line status information received from EKTS 101 is not ambiguous to automated attendant 109. Similarly, automated attendant 109 knows that, if a line was idle, then a received ring-line status 302 is a ringing state rather than a return-from-transfer state 308. However, a ring-line status 302 received after a transfer command 503 is sent by automated attendant 109 would indicate a return-from-transfer state 308. And similarly, line connect status 615 received after automated attendant 109 sent a connect-line command 501 would confirm the connected state 303 rather than the active-other state 307. However, a line connect status 615 received after automated attendant 109 sent a transfer-line command 503 would confirm the active-other state 307.

Many EKTS may also provide attendant ports 111 with line status signals, 340 of Table 300, about lines active at other station set ports. These line status signals are not required by automated attendant 109. However, automated attendant 109 must be able to distinguish these line status signals from the line status of lines controlled by automated attendant 109. Automated attendant 109 uses the ACD bit of Table 603 for determining which status signals 309, 310 and 311 occur on lines which do not operate under control of automated attendant 109. An ACD bit of logic 1 (e.g., 618 in Table 603) indicates the line status is for a line controlled by automated attendant 109.

Automated attendant 109 also receives the information shown in Table 400 of FIG. 4 from controller 102 regarding the agent status at each agent position.

In response to one or more of the line or agent status signals, automated attendant 109 transmits the commands, shown in Table 500 of FIG. 5, as it directs controller 102 to answer calls, place them on hold, and transfer them to available agent positions (103-1 to 103-N).

DETAILED DESCRIPTION

In the following description, each block or element of each figure has a reference designation associated therewith, the first number of which refers to the figure in which that element is located (e.g., 101 is located in FIG. 1).

Figure 8:
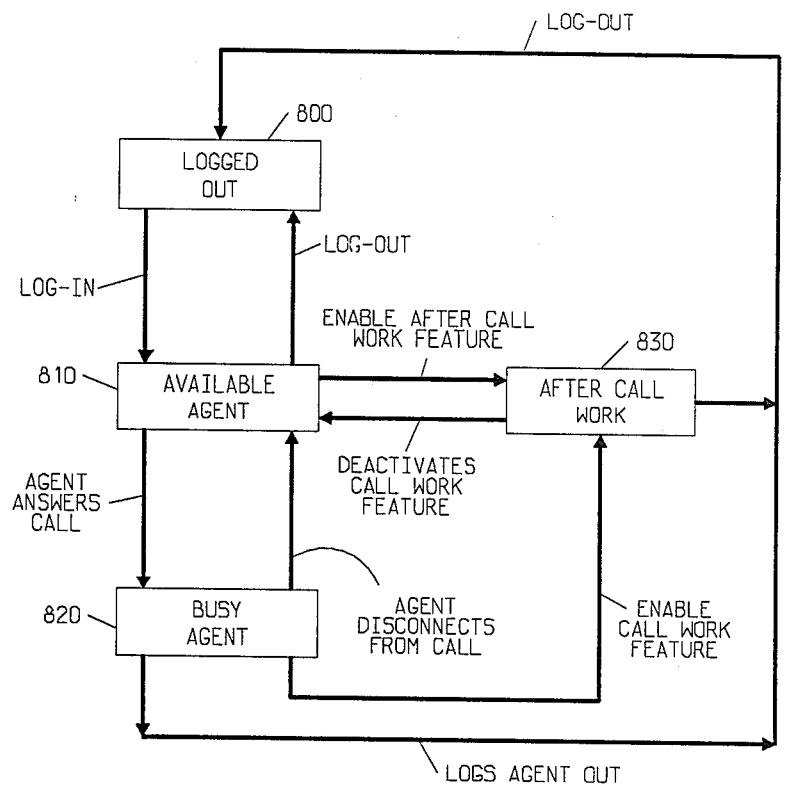
FIG. 8 shows a state diagram of agent states and state transitions.

Before proceeding with the detailed operating description of the present invention, it should be recognized that the present invention may be utilized with a variety of computer controlled automated attendants 109 and controllers 102. Since such automated attendants 109 and controllers 102 utilize a variety of hardware and programming techniques, no attempt is made to describe the programs used to control the automated attendant 109 or controller 102. However, the concepts and teachings of the present invention must be blended into the overall operating structure of the particular automated attendant 109 and controller 102 in which it is used and must be tailored to mesh with other features and operations programmed therein. Thus, in order to avoid confusion and in order to enable those skilled in the art to practice the claimed invention, this specification will describe the operation of the present invention using the block diagrams of FIGS. 1 and 2, the tables of FIGS. 3-6, and the flow charts of FIGS. 7 and 8, which together describe the logical steps and the various parameters required to implement the present invention.

The following is a brief description of the operation of the present invention. Station set interface 108 receives the lamp or light-emitting diode (LED) line status information in the received message format shown in 601 (FIG. 6) and strips off the button visual indicator (button number) 602 and its visual status 607 which is outputted to automated attendant 109. Automated attendant 109 decodes the button number 602 using Table 603 to identify which line (e.g., 604) or agent (e.g., 605) the button is associated with. The ACD column 613 in Table 603 indicates whether or not a line or agent operates under control of automated attendant 109. Automated attendant controls lines and agents having an ACD of logic 1 in column 613 (e.g., 604 and 605) and ignores those with logic 0 therein (e.g., 621 and 618). The button visual status information 607 is decoded using Table 608 to determine the line status 609, i.e., idle, ringing, hold, or connected. Automated attendant 109 then uses this information derived from button number 602 and visual status 607 as an input to its operating program as described in the state and flow diagrams of FIGS. 7 and 8.

Basically, automated attendant 109 provides equitable processing of incoming calls by answering ringing lines and directing calls to one of several agents assigned to handle the calls. As will be discussed in detail in a later paragraph, agent availability is determined by checking Table 400 for each agent. An agent must first log-in to the system; otherwise, the agent state is log-out 401. The after-call-work state 404 indicates that agent is busy doing other call-related work. The busy-on-call state 403 and agent-available state 402 are dependent upon station status. If all agents are busy or logged-out, automated attendant 109 answers the calls, plays recorded announcements to the callers to inform them that someone will be available soon, and places the calls in a queue to wait for an agent. As agents become available, the calls are directed to the agents by automated attendant 109 using commands sent to system controller 102 in the format shown in transmit message 610.

Automated attendant uses Table 500 to convert call commands into line, agent, direct station selection, touch-tone, or function buttons and then the particular button identification number is determined from Table 603 and inserted as button depression information 611 of transmit message 610. Switchhook status 612 is also inserted into the transmit message 610. Actually, station set interface 108 formats switchhook status 612 and button information 611 into the transmit message format shown in 610.

A state diagram of the operations of automated attendant 109 is illustrated in FIG. 7. Note, automated attendant 109 maintains state tables which specify the state of each line and agent which it controls.

EKTS 101 monitors lines 105 from the central office for newly-arrived calls. When EKTS 101 detects a ringing line, the EKTS notifies automated attendant 109 that an incoming call has arrived by transmitting the ringing-line status 302 for the particular line to automated attendant 109. Automated attendant 109 maintains a FIFO (first in/first out) queue (not shown)—called the ringing-call queue—that contains all calls that are currently in the ringing state. As automated attendant 109 is informed of the ringing-line status 302, the call is placed at the end of the ringing-call queue to be handled by the automated attendant 109 in order of arrival.

EKTS 101 continues to monitor the state of the ringing line. If the caller hangs up before the call is answered by the automated attendant 109, EKTS 101 notifies the automated attendant that the line is now idle, using idle status 301 in message 601. The automated attendant 109 considers the call to be an abandoned unanswered call and removes the call from the ringing-call queue.

When automated attendant 109 detects that a line under its control has changed from the idle state 700 to the ringing state 710, it answers the call (720). This occurs when a received message 601 received from EKTS 101 has button number 602 which refers to a line (e.g., 604) which has an ACD bit=1 and visual status 607 which indicates a ringing status (i.e., 614).

If more than one line is ringing, a ringing-call queue is established by automated attendant 109. Automated attendant 109 then answers the first call in the ringing-call queue by transmitting a connect command 501 for the associated ringing line 604 to EKTS 101. EKTS 101 connects the call to the port 111 from which the connect command was received and notifies automated attendant 109 that the call is now connected by sending the connect status 303 for the associated line in message 601. Once the automated attendant 109 has determined that the call is connected to SSI 108, automated attendant 109 attempts to transfer the call to an available agent. Automated attendant 109 checks the agent status Tables 400 for each agent to find an available agent. If an agent is available to receive the call, automated attendant 109 immediately transfers the call to that agent (760). This is accomplished by sending a transfer command 503 including the transfer function button code 619 and the agent's location DSS button code 620 in two successive transmit messages 610 to EKTS 101. This is confirmed by a hold-line status message 306 for the associated line from EKTS 101. If an agent is not available, automated attendant 109 presents a voice announcement to the caller (730). When the voice announcement is completed, the call is placed on hold (740).

To place the call on hold, automated attendant 109 sends a hold command 502 using the transmit message 610 which identifies the hold button (i.e., 622). EKTS 101 confirms the call has been placed on hold by returning a message 601 that contains the hold button status (616) for the line button number 604 associated with the call. Note, if more than one incoming call has been placed on hold, automated attendant 109 sets up a waiting-call queue.

EKTS 101 monitors lines 105 associated with calls on hold. If EKTS 101 determines that a held call is disconnected by the caller, EKTS 101 notifies automated attendant 109 that the line is now idle. This is done using message 601 with idle-button status 617 as the visual status 607 for the appropriate line button number 602. Automated attendant 109 removes the call from the waiting-call queue and returns the particular line to the idle state (700). Note, this state transition is not shown in FIG. 7. Automated attendant 109 performs no further operation on the line until another ringing line is detected by EKTS 101. Automated attendant 109 constantly monitors Tables 400 for an idle agent.

The call is then transferred to an agent when one becomes available (750 and 760) by transferring the answered call to the available agent. This occurs by automated attendant 109 first reconnecting to the held call by sending a connect command 501 with the calling party line number in message 610 to EKTS 101. EKTS 101 confirms this by sending a message 601 indicating a connect line status 615 for the calling party line number. Once in state 750, automated attendant 109 then sends a transfer command 503 to EKTS 101. The transfer command 503 actually consists of two messages 610, one being the transfer button depression and the second being a direct station selection button (DSS) associated with the agent to receive the transferred call. (Note, other prestored numbers can also be dialed using the touch-tone digits 606 of Table 603.) As a result, EKTS 101 rings the agent's station set and then confirms this transfer state 760 by sending the hold-line status 306 to automated attendant 109.

When the agent answers the transferred call, EKTS 101 notifies the automated attendant 109 that the call has entered the active-other state 770 using connect line status 307 in message 601. After the agent has answered the call, automated attendant 109 performs no further control operations on the line until the agent disconnects from the call (770 to 700) and EKTS 101 detects another incoming call (700 to 710). While connected to the call, the agent is in control and can perform any available EKTS features, such as placing the call on hold, without intervention from the automated attendant.

When the agent answers the call, EKTS 101 also notifies automated attendant 109 that the agent has entered the busy state 403.

When the call between the caller and the agent is completed, the agent disconnects from the call by hanging up. EKTS 101 determines that that line is now idle and notifies automated attendant 109 by sending an idle line status 617 in message 601. Automated attendant 109 then goes from state 770 to the idle-line state 700 and will now answer any incoming call on that line. As the agent disconnects from the call, EKTS 101 also notifies automated attendant 109 that the agent has entered available state 402.

Assuming that a call has been transferred to an assigned available agent as shown in state 760 of FIG. 7, if the assigned agent does not answer the transferred call within a predetermined number of rings, EKTS 101 sends a ring-line status message 601 to automated attendant 109. Automated attendant 109 decodes the ring-line status 614 as a return-from-transfer 308 since it recalls previously transferring the call. Automated attendant 109 then enters the return-from-transfer state 780 and sends a connect message 501 to EKTS 101. EKTS 101 responds with connected line status message 303 indicating that automated attendant 109 can enter call-connected state 750.

If a different agent is available to receive the call, automated attendant 109 transfers to the other available agent as previously described (state 750 to state 760 transition). Automated attendant 109 re-enters the call-transfer-in-progress state 760.

If a different agent is not available and the caller has not received the voice announcement, automated attendant 109 presents the voice announcement in state 730. Once the call has been placed in the voice-announcement state, the previously discussed transitions from that state 730 can be made.

If a different agent is not available and the caller has already received the voice announcement, the automated attendant enters state 740 and places the call on hold until another agent becomes available. Since the call has already been on the waiting-call queue, automated attendant 109 places it at the beginning of the queue so that it will be transferred to the next available agent. Once the call has been placed in the hold-for-available-agent state 740, the previously discussed transitions from that state can be made.

Just as the call processing procedure ensures the equitable servicing of incoming calls, the agent selection procedure of the present invention serves to equally distribute the calls among the agents. Given several agents, all of whom are available to receive a call, the agent that has been available the longest is selected. (Note, other agent selection criteria may be employed. Automated attendant 109 could base its agent selection based on a ratio of idle time:busy time, if desired.) The call is then directed to that agent by automated attendant 109.

As previously noted, automated attendant 109 maintains Table 400 of FIG. 4 to indicate each agent's availability status. Each table keeps track of an agent's states and is updated each time an agent logs-in or out, goes off-hook or on-hook, or does after-call-work. Assume that an agent is logged-out, then the log-in bit of Table 400 is zero, indicating that the agent is in the logged-out state 800.

When an agent logs-in by the supervisor signaling automated attendant 109, the log-in bit is set to 1 in Table 400 and the agent enters the available state 810 and can receive calls from automated attendant 109. When the agent answers a call directed to the agent by automated attendant 109, the station status is set to off-hook in Table 400 and the agent is placed into the busy state 820. The agent will not be considered for another call until the station status returns to the on-hook condition in Table 400 and the agent returns to the available state 810. At this time, the agent selection procedure previously described considers the agent for the next call.

Note, automated attendant 109 maintains a queue (not shown herein) of available agents. As agents become available (810), they are attached to the end of the queue. When a call is to be directed to an agent, the agent at the head of the queue (the longest available agent) is assigned the call.

If EKTS 101 supports after-call-work state signals from the agent's station set position to automated attendant 109, then agents can signal to automated attendant 109 that they are doing other work and are not available to receive another call. For example, this may be accomplished using a message-waiting lamp at each agent's station set as a busy indicator. From either the available 810 or busy state 820, the agent can enter the after-call-work state 830 by sending the appropriate signal to EKTS 101. EKTS 101 signals automated attendant 109 which updates Table 400 and sets agent in state 830. When the work is completed and the agent wishes to receive another call, the agent can deactivate the feature. The automated attendant 109 then updates Table 400 and puts the agent into the available state 810 to wait for a call. From any of states 810, 820 or 830, the agent can log-out and return to logged-out state 800.

If a call is transferred to an agent and that agent fails to answer the call, automated attendant 109 can only assume that the agent is no longer available to receive calls. Automated attendant 109 can remove the agent from the pool of available agents in one of the two following ways.

First, if the after-call-work state feature is supported, automated attendant 109 activates the after-call-work feature for the agent. The agent can then exit from the state upon returning to the station set.

Second, if the after-call-work feature is not available, automated attendant 109 can deactivate the agent by logging him out. In either case, automated attendant 109 gives the supervisor console 220 notification of the event on the console display.

All lines and station set positions connected to the EKTS 101 may not be under the control of the automated attendant 109. The standard administration procedures of EKTS 101 are used to specify which lines are to be handled by automated attendant 109 and which are not. Similar procedures are required to inform automated attendant 109 which station set positions are manned by agents who are to receive calls and which are not. Automated attendant 109 only directs calls on the administered lines to the administered agent positions. Activity on other lines and at other agent positions will be ignored. As previously noted, the ACD bit in Table 603 indicates those lines and agents which operate under control of automated attendant 109. Thus, lines not assigned to automatic attendant 109 can be used either by logged-in or logged-out agent positions 103 for purposes unrelated to the automated attendant.

Some automatic call distributors support multiple line groups and agent splits. A line group is defined as one or more lines through which calls of a specific nature are received, while an agent split is one or more agents who are prepared to handle specific inquiries. One line group may be set up to handle billing inquiries, while a second line group may be intended for service requests. Automated attendant 109 can be administered to direct calls in the first line group to an agent split containing agents prepared to check accounting records, while calls to the second group can be directed to an agent split containing agents prepared to schedule a service visit. The automated attendant 109 maintains separate ringing-line queues and waiting-call queues for each line group and for each agent split maintains separate available-agent queues. The automated-attendant 109 then routes calls from a specific line group to a specific agent split.

The following administrative commands are required for automated attendant 109 operation:

Assign/De-Assign a Line to a Line Group—The supervisor can specify that a specific line is to be assigned to a line group or removed from a line group.

Log In/Log Out an Agent to an Agent Split—The supervisor can attach or detach an agent from an agent split.

Direct Calls from Line Group to Agent Split—The supervisor can instruct the automated attendant to direct calls-received lines in a particular line group to agents attached to a specific agent split.

It is contemplated that other administrative features can be implemented. For example, lines assigned to line groups can be administered a priority level, i.e., low priority or high priority. Calls arriving on high priority lines are answered and directed to agents before calls arriving on low priority lines.

Additionally, line groups can be administered an overflow agent split. If calls are kept on hold beyond a specified amount of time, the call will be directed to available agents in the overflow split.

Moreover, automated attendant 109 can be administered to answer calls that arrive after business hours, play a voice announcement message, and disconnect from the call.

If VAU 110 can support multiple voice messages, the administrator can record special announcements for each line group and administer automated attendant 109 to play specific messages to specific line groups. Obviously, automated attendant 109 could be adapted to control multiple VAU units and SSI units connected to several Attendant Ports. Several calls can then be simultaneously processed.

Moreover, the present adjunct call manager can be made to function as a data-in-voice-answer (DIVA) system whereby calling parties are connected to automated attendant 109 as described previously in steps 700, 710, 720 and 730 of FIG. 7. After a voice announcement is played to the caller, the caller may be directed to enter one or more touch-tone dialing digits. These touch-tone digits are decoded in SSI 108 using touch-tone decoder 215 and forwarded to processor 212. Processor 212 communicates this information via parallel interface 216 to automated attendant 109 which then uses the decoded digits to access one of a group of prerecorded announcements in VAU 110. This interactive process can continue with the caller until some predetermined event calls for automated attendant 109 to connect the caller to an agent as previously described in steps 760 and 770. Obviously, the results of the DIVA interactions can be accumulated in mass storage 230, compiled by automated attendant 109 and outputted on line printer 240.

What has been described is merely illustrative of one embodiment of the principles of the present invention. Other methods, sequences or circuits can be used by those skilled in the art to implement the present invention without departing from the spirit and scope of the present invention.

What is claimed is:

1. An adjunct call manager unit arranged for connection to a station port of a telephone communication system for controlling the management of calls received over a plurality of communication lines connected to said system, said adjunct comprising
    means for receiving a station line status signal from predetermined ones of said lines via said station port;
    means for sending via said station port one or more station line control signals selected from a group including feature control signals, line control signals, and switchhook control signals; and
    means responsive to said station line status signal for generating a predetermined call control command for output to said sending means wherein said control command includes one or more of said station line control signals.

2. The adjunct unit of claim 1 wherein said station line status signal includes a button number visual indicator signal and a visual indicator status signal.

3. The adjunct unit of claim 2 further comprising means for decoding said button number visual indicator signal into a line identification signal and decoding said visual indicator status signal into a line status signal.

4. The adjunct unit of claim 3 wherein said decoding means decodes button number visual indicator signal into an agent identification signal and decodes said agent signal into an agent status signal.

5. The adjunct unit of claim 1 wherein said station line control signals include a depressed button identification signal and a switchhook status signal.

6. The adjunct unit of claim 5 further comprising means for converting said line control signals into one or more depressed button identification signals.

7. The adjunct unit of claim 1 wherein said generating means is a programmable terminal.

8. The adjunct unit of claim 1 wherein
    said sending means includes means for coupling an output from an audio signal means to a call on said system and
    said generating means includes means for controlling the operation of said audio signal means.

9. The adjunct unit of claim 8 wherein said sending means includes audio receiving means for coupling an audio signal received from said station port to said audio signal means for recording thereat.

10. The adjunct unit of claim 8 further including
    means for detecting dialing signals received from said system and
    said generating means including means responsive to said dialing signal detecting means for selecting a predetermined audio signal from said audio signal means for output via said sending means.

11. The adjunct unit of claim 1 further including a station set connected to said system for providing voice communication therebetween.

12. The adjunct unit of claim 1 wherein said generating means includes means for controlling the output of data to an external device in response to a predetermined condition at said generating means.

13. The adjunct unit of claim 1 wherein said generating means includes means for receiving information specifying the existence of an agent at predetermined station set locations.

14. The invention of claim 1 wherein said adjunct unit includes means for determining which lines and station sets operate under control of said command generating means.

15. The invention of claim 14 wherein said adjunct unit further includes means for selecting lines and station sets identified in said determining means.

16. A communication system comprising a plurality of station sets each connected through a station port to a controller unit for controlling communications over a plurality of communication lines, said system further comprising an adjunct call manager unit connected through one of said station ports to said controller unit, said adjunct unit including means for receiving a station line status signal from predetermined ones of said lines via said station port;

means for sending via said station port a station line control signal selected from a group including feature control signals, line control signals, and switchhook control signals; and means responsive to said station line status signal for generating a predetermined call control command for output to said sending means wherein said control command includes one or more of said line control signals.

* * * * *